(12) United States Patent
Liu

(10) Patent No.: US 9,071,996 B2
(45) Date of Patent: Jun. 30, 2015

(54) METHOD AND APPARATUS FOR TRANSMITTING SIGNALING TRACE COMMAND

(75) Inventor: Jing Liu, Shenzhen (CN)

(73) Assignee: ZTE Corporation, Shenzhen, GD (CN)

( * ) Notice: Subject to any disclaimer, the term of this patent is extended or adjusted under 35 U.S.C. 154(b) by 86 days.

(21) Appl. No.: 13/580,838

(22) PCT Filed: Aug. 11, 2010

(86) PCT No.: PCT/CN2010/075909
§ 371 (c)(1),
(2), (4) Date: Aug. 23, 2012

(87) PCT Pub. No.: WO2011/113252
PCT Pub. Date: Sep. 22, 2011

(65) Prior Publication Data
US 2012/0329450 A1 Dec. 27, 2012

(30) Foreign Application Priority Data
Mar. 16, 2010 (CN) .......................... 2010 1 0138627

(51) Int. Cl.
H04W 36/00 (2009.01)
H04W 24/08 (2009.01)
H04L 12/26 (2006.01)
H04W 92/12 (2009.01)

(52) U.S. Cl.
CPC ............. H04W 24/08 (2013.01); H04L 43/04 (2013.01); H04L 43/12 (2013.01); H04W 92/12 (2013.01)

(58) Field of Classification Search
CPC ..... H04W 24/08; H04W 92/12; H04W 36/00; H04W 76/00; H04W 76/02; H04W 36/0083; H04L 43/04; H04L 43/12

USPC .................. 455/425, 436, 438, 439
See application file for complete search history.

(56) References Cited

U.S. PATENT DOCUMENTS

| | | | |
|---|---|---|---|
| 2009/0075655 A1* | 3/2009 | Dobson et al. ................ | 455/436 |
| 2009/0233611 A1* | 9/2009 | Olsson et al. ................ | 455/446 |
| 2009/0247150 A1* | 10/2009 | Fischer et al. ................ | 455/425 |

(Continued)

FOREIGN PATENT DOCUMENTS

| | | |
|---|---|---|
| CN | 1988480 | 6/2007 |
| CN | 101242631 | 8/2008 |

(Continued)

OTHER PUBLICATIONS

An English Translation of the International Search Report dated Dec. 30, 2010, which issued during the prosecution of Applicant's PCT/CN2010/075909.

(Continued)

*Primary Examiner* — Kamran Afshar
*Assistant Examiner* — Mong-Thuy Tran
(74) *Attorney, Agent, or Firm* — Diederiks & Whitelaw, PLC

(57) ABSTRACT

The disclosure provides a method for transmitting signaling trace command, comprising the steps of: carrying signaling trace configuration parameters corresponding to a plurality of signaling traces in signaling trace command; transmitting the signaling trace command to activate or maintain the signaling traces. The disclosure also provides an apparatus for transmitting signaling trace command. The method and apparatus can reduce the signaling interaction load of the S1 interface, thereby improving the performance of a system.

6 Claims, 6 Drawing Sheets

(56) References Cited

U.S. PATENT DOCUMENTS

| | | | |
|---|---|---|---|
| 2009/0312001 A1* | 12/2009 | Bodog | 455/418 |
| 2010/0303039 A1* | 12/2010 | Zhang et al. | 370/331 |
| 2011/0153844 A1* | 6/2011 | Bovo et al. | 709/228 |
| 2012/0309431 A1* | 12/2012 | Bodog | 455/456.6 |

FOREIGN PATENT DOCUMENTS

| | | |
|---|---|---|
| CN | 101272604 | 9/2008 |
| WO | WO 2007/148633 | 12/2007 |
| WO | WO 2008/008713 | 1/2008 |

OTHER PUBLICATIONS

An English Translation of the Written Opinion dated Dec. 16, 2010, which issued during the prosecution of Applicant's PCT/CN2010/075909.

An English Translation of the International Preliminary Report on Patentability dated Sep. 18, 2012, which issued during the prosecution of Applicant's PCT/CN2010/075909.

Huawei, "*Discussion of Trace Function in E-UTRAN*", 3GPP TSG RAN WG3 Meeting #55, pp. 1-6, Feb. 12-16, 2007.

* cited by examiner and Apparatus for Transmitting Signaling Trace Information" filed Aug. 11, 2010, pending.

METHOD AND APPARATUS FOR TRANSMITTING SIGNALING TRACE COMMAND

CROSS-REFERENCE TO RELATED APPLICATIONS

This application represents a National Stage application of PCT/CN2010/075909 entitled "Method and Apparatus for Transmitting Signaling Trace Information" filed Aug. 11, 2010, pending.

TECHNICAL FIELD

The disclosure relates to the field of communications, in particular to a method and an apparatus for transmitting signaling trace command.

BACKGROUND

The object of entire network element signaling trace functionality of a communication system is to trace the signaling message of all User Equipments (UEs) or a specified UE in certain cell, so as to test and locate a problem and analyze the system optimization.

In related art, the process of activating and deactivating signaling trace based on management or signaling control is defined, wherein the traced object can be one or more cells or can be one or more specified UEs.

The process of activating the signaling trace of one or more cells based on management is as follows: if the signaling trace of certain cell is activated, for all the existing UEs and later accessed new UEs on the activated cell, a Node B on an evolved UMTS Terrestrial Radio Access Network (E-UTRAN Node B, or eNB) should transmit a CELL TRAFFIC TRACE message to a Mobility Management Entity (MME) and transmit the signaling to a signaling collection entity according to configured signaling trace parameters.

Meanwhile, the signaling trace of one or more specified UEs can be activated based on management or signaling; for the activating mode based on signaling, the process comprises the following scenarios:

1) an eNB receives a signaling trace start (TRACE START) message transmitted by an MME and immediately activates the signaling trace according to the signaling trace parameter configuration in the message;

2) the eNB receives an INITIAL CONTEXT SETUP REQUEST message transmitted by the MME, if the message carries a Trace Activation cell, the eNB immediately activates the signaling trace according to the signaling trace parameter configuration in the cell;

3) the eNB receives a HANDOVER REQUEST message on the X2 interface, if the message carries a Trace Activation cell, the eNB immediately activates the signaling trace according to the signaling trace parameter configuration in the cell;

4) the eNB receives a HANDOVER REQUEST message on the S1 interface, if the message carries a Trace Activation cell, the eNB immediately activates the signaling trace according to the signaling trace parameter configuration in the cell;

in which, the signaling trace configuration parameters (located in the Trace Activation cell) includes the following content:

1) E-UTRAN Trace ID, which consists of Trace Reference and Trace Recording Session Reference and uniquely identifies a trace in the E-UTRAN;

2) Interface To Trace, which indicates the interface(s) on which the signaling is to be traced, wherein the interface can be SI-MME, X2, Uu or other interfaces;

3) Trace depth, which indicates the content form of reporting signaling, including shallow layer, middle layer, deep layer, factory defined shallow layer, factory defined middle layer and factory defined deep layer;

4) Trace Collection Entity IP Address.

During the full network element signaling trace, a trace can be identified by an E-UTRAN Trace ID uniquely; for the same UE, the signaling trace start message might be received for several times. In this case, if the Trace Reference is different in the message, a new trace should be started once according to the configuration parameter in the message; as shown in FIG. 1 (in FIG. 1, the trace start message transmitted by the MME to the eNB can be the TRACE START or INITIAL CONTEXT SETUP REQUEST message); that is to say, for the same UE, there might exist a plurality of traces, for example, trace of signaling on different interfaces, use of a plurality of different signaling collection entities.

If the UE which has started the signaling trace is about to switch the X2 interface, a switched source eNB should save the current trace configuration parameter and meanwhile carry the configuration parameter in the Trace Activation cell of the HANDOVER REQUEST message to transmit to a target eNB; after receiving the message, the target eNB should immediately start the trace according to the requirement of the trace parameter so as to guarantee the continuity of trace. If the UE is about to switch the S1 interface, the MME side is responsible for entering the trace information into the Trace Activation cell of the HANDOVER REQUEST message for transmission to the target eNB; after receiving the message, the target eNB should immediately start the trace according to the requirement of the trace parameter so as to guarantee the continuity of trace.

In related art, since the Trace Activation cell of the HANDOVER REQUEST message on the X2 interface only saves one piece of trace configuration information, in the case that the UE starts a plurality of traces at the switched source eNB side, after handover, only one piece of traced information can be carried to the target eNB side and started, while other traces have to be interrupted. Likewise, during the S1 handover, since the Trace Activation cell of the HANDOVER REQUEST message on the S1 interface only saves one piece of trace configuration information too, after handover, only one piece of traced information can be carried to the target eNB side and started, while other traces have to be interrupted.

Meanwhile, in the case that the S1 connection of the UE does not exist, if the MME receives a trace configuration command transmitted by an Element Manager (EM) for the UE, the MME needs to transmit a trace start message on the S1 interface to the eNB to indicate the eNB to start the signaling trace of the UE, when the S1 logic link of the UE is established successfully. The trace start message on the S1 interface includes TRACE START and INITIAL CONTEXT SETUP REQUEST message. Since the TRACE START and INITIAL CONTEXT SETUP REQUEST messages both include a piece of trace configuration information, if the EM transmits a plurality of trace configurations (with different trace IDs) to the MME when the UE S1 link does not exist, the MME needs to transmit a plurality of trace start messages (the message can be an INITIAL CONTEXT SETUP REQUEST messages plus a plurality of TRACE START messages, or a plurality of TRACE START messages) to the eNB continuously to start the plurality of traces when the S1 link of the UE is established; in this way, the signaling interaction load of the S1 interface is increased undoubtedly.

The problem above also exists in the trace based on cell; since the CELL TRAFFIC TRACE message also carries only one set of trace configuration parameters, when a plurality of traces configured by the EM for the same cell is activated, all existing UEs and later added UEs on the activated cell need to transmit a plurality of CELL TRAFFIC TRACE messages to the MME to start all traces; in this way, the signaling interaction load of the S1 interface is greatly increased too.

SUMMARY

The main object of the disclosure is to provide a method and an apparatus for transmitting signaling trace command, to solve at least one of the problems above.

According to one aspect of the disclosure, a method for transmitting signaling trace command is provided, comprising the steps of: carrying signaling trace configuration parameters corresponding to a plurality of signaling traces in the signaling trace command; and transmitting the signaling trace command to activate or maintain the plurality of signaling traces.

Further, the signaling trace configuration parameters corresponding to the plurality of signaling traces are carried by setting a cell format in the signaling trace command to be a form of array.

Further, X2 interface handover occurs on a UE corresponding to the plurality of signaling traces; wherein the signaling trace command is a handover request message on the X2 interface; and wherein the step of transmitting the signaling trace command further comprising: transmitting, by a switched source evolved NodeB (eNB), the handover request message to a switched target eNB to maintain the plurality of signaling traces of the UE.

Further, S1 interface handover occurs on a UE corresponding to a plurality of signaling traces; the signaling trace command is a handover request message on the S1 interface; wherein transmitting the signaling trace command further comprising: transmitting, by a Mobility Management Entity (MME), the handover request message to a switched target eNB to maintain the plurality of signaling traces of the UE.

Further, a UE corresponding to a plurality of signaling traces has not established an S1 link; the signaling trace command includes a signaling trace start message or a context setup request message; wherein transmitting the signaling trace command further comprising: when the UE successfully establishes an S1 link, transmitting, by a MME, the signaling trace command to an eNB corresponding to the UE to activate the plurality of signaling traces of the UE.

Further, the signaling trace configuration parameters corresponding to a plurality of signaling traces are carried by setting a trace activation cell format in the signaling trace command to be a form of array.

Further, the plurality of signaling traces is activated in a cell; the signaling trace command is a cell trace message; wherein transmitting the signaling trace command further comprising: transmitting, by an eNB corresponding to the cell, the cell trace message to an MME for the MME to activate the plurality of signaling traces of UEs in the cell.

Further, the signaling trace configuration parameters corresponding to the plurality of signaling traces are carried by setting a cell format of E-UTRAN Trace ID and Trace Collection Entity IP Address in the signaling trace command to be a form of array.

According to another aspect of the disclosure, an apparatus for transmitting signaling trace command is provided, comprising: a setting module configured to carry signaling trace configuration parameters corresponding to a plurality of signaling traces in signaling trace command; and a transmission module configured to transmit the signaling trace command to activate or maintain the plurality of signaling traces.

Further, the setting module carries the signaling trace configuration parameters corresponding to the plurality of signaling traces by setting a cell format of the signaling trace command to be a form of array.

By carrying signaling trace configuration parameters corresponding to a plurality of signaling traces in signaling trace command and transmitting the information, the invention solves the problem in related art that a heavy burden is caused on the S1 interface by signaling interaction when a plurality of signaling traces are activated and/or maintained, reduces the signaling interaction load of the S1 interface and improves the performance of the system.

BRIEF DESCRIPTION OF THE DRAWINGS

For a better understanding of the disclosure, accompanying drawings described hereinafter are provided to constitute one part of the specification; the schematic embodiments of the disclosure and description thereof are used to illustrate the disclosure but to limit the disclosure. In the accompanying drawings.

DETAILED DESCRIPTION OF THE EMBODIMENTS

The disclosure is described below in detail by reference to the accompanying figures in conjunction with embodiments. It should be noted that the embodiments and the characteristics of the embodiments in the application can be combined if no conflict is caused.

In the case that it is needed to activate the signaling trace, generally, an eNB transmits signaling trace command to an MME or an MME transmits signaling trace command to an eNB; in the case that it is needed to maintain the signaling trace of a switched terminal, generally, a source eNB transmits signaling trace command to a target eNB or an MME transmits signaling trace command to a target eNB; in related art, the inventor finds that message overhead is great and signaling interaction load is increased because the signaling trace command can only carry the trace configuration parameter corresponding to a trace; the solution provided by the embodiment below makes an improvement for the above.

Figure 3:
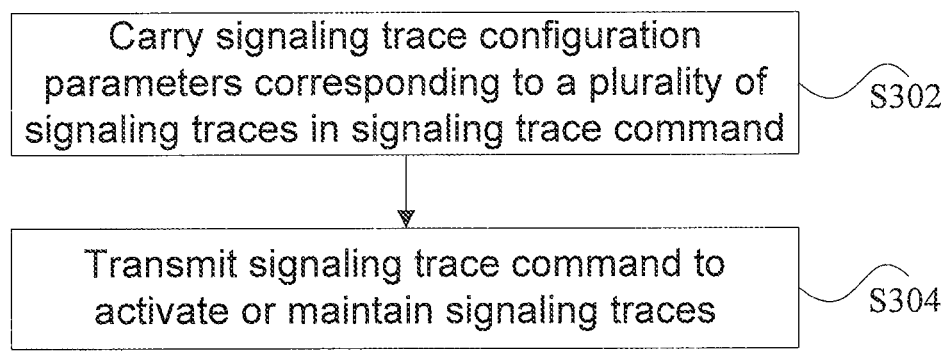
FIG. 3 shows a flowchart of a method for transmitting signaling trace command according to one embodiment of the invention.

FIG. 3 shows a flowchart of a method for transmitting signaling trace command according to one embodiment of the invention, wherein the method comprises the following steps:

Step 302: carry signaling trace configuration parameters corresponding to a plurality of signaling traces in signaling trace command.

Step 304: transmit the signaling trace command to activate or maintain the signaling traces.

In related art, the signaling trace command only carries the signaling trace configuration parameters corresponding to a signaling trace, if a plurality of signaling traces exists, multiple pieces of signaling trace command need to be transmitted in the case of activating or maintaining the signaling traces; thus the signaling interaction load of the S1 interface is increased. By carrying signaling trace configuration parameters corresponding to a plurality of signaling traces in the signaling trace command, the method provided by the embodiment can notify the parameters of the current plurality of signaling traces to a receiving end through one piece of information, thereby reducing the signaling interaction load of the S1 interface and improving the performance of the system.

Preferably, the signaling trace configuration parameters corresponding to a plurality of signaling traces can be carried by setting the cell format in the signaling trace command to be the form of an array, wherein the process of carrying the signaling trace configuration parameters corresponding to a plurality of signaling traces by way of array is easy to implement and requires minor modification of the information format. Of course, the signaling trace configuration parameters corresponding to a plurality of signaling traces also can be carried by other ways; the carrying mode is not limited to the array form.

The method above can be applied to the following situations:

(1) X2 interface handover occurs on the UE corresponding to a plurality of signaling traces; the signaling trace command is a HANDOVER REQUEST message on the X2 interface; the process of transmitting the signaling trace command comprises a step of: transmitting, by a switched source eNB, the handover request message to a switched target eNB to maintain the signaling traces of the UE.

In this way, if handover, for example, X2 handover, occurs when the UE starts a plurality of traces, the source eNB can carry all trace information in the HANDOVER REQUEST message to transmit to the target eNB; then the target eNB starts the trace to guarantee the integrity of the trace before and after the handover.

Preferably, the signaling trace configuration parameters corresponding to a plurality of signaling traces can be carried by setting the TRACE Activation cell format in the signaling trace command to be the form of array. This method is easy to implement and requires minor modification for the present information format.

Figure 4:
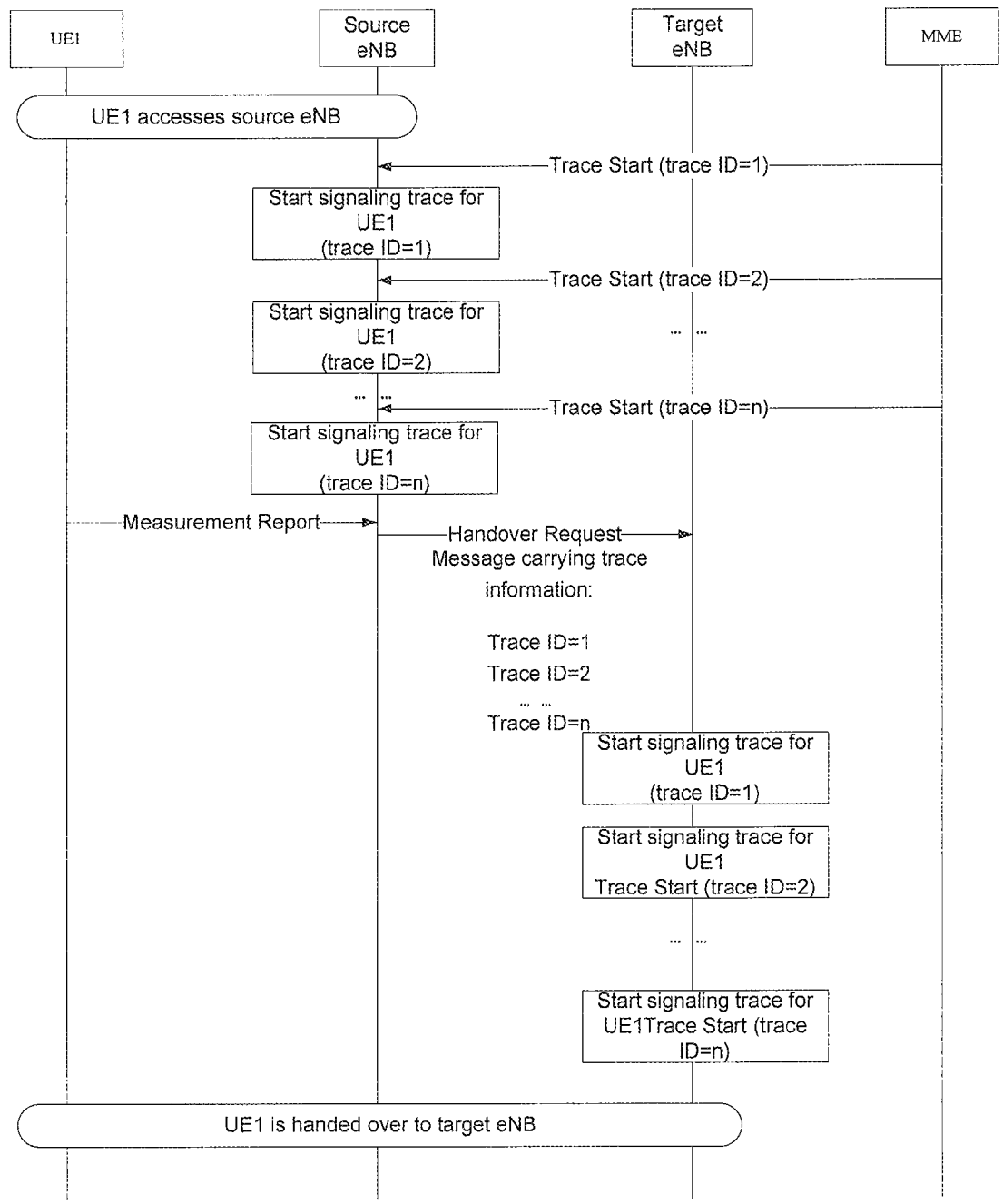
FIG. 4 shows a flowchart of a UE performing X2 handover in the case of a plurality of traces according to the preferred embodiment of the disclosure.

FIG. 4 shows an X2 handover process in the case of a plurality of traces, wherein the process comprises the following steps:

Step 1: UE1 accesses a source eNB.

Step 2: during the service period, the source eNB receives a trace start message transmitted by an MME for n times (n is greater than 1), wherein it is indicated to start the signaling trace for the UE1 in the message; since the trace ID in the trace start message is different, the source eNB starts a total of n traces for the UE1 according to the requirement of the trace configuration parameters transmitted every time.

Step 3: the source eNB receives a measurement report reported by the UE1 and determines that it is X2 interface handover by means of policy.

Step 4: the source eNB assembles the HANDOVER REQUEST message on the X2 interface and transmits the message to the eNB, wherein the Trace Activation cell in the HANDOVER REQUEST message can carry n pieces of trace configuration information with trace ID of 1 to n after being modified into the form of array.

Step 5: after receiving the HANDOVER REQUEST message, the target eNB determines that a Trace Activation cell is carried in the message, and meanwhile starts the n traces with trace ID of 1 to n according to the parameter configuration in the cell.

Step 6: the UE1 is handed over to the target eNB.

(2) S1 interface handover occurs on the UE corresponding to a plurality of signaling traces; the signaling trace command is a HANDOVER REQUEST message on the S1 interface; the process of transmitting the signaling trace command comprises a step of: transmitting, by an MME, the handover request message to a switched target eNB to maintain the signaling traces of the UE.

In this way, if handover, for example, S1 handover, occurs when the UE starts a plurality of traces, the MME can notify all trace information started by the UE at the source eNB to the target eNB; then the target eNB starts the trace to guarantee the integrity of the trace before and after the handover.

Preferably, the signaling trace configuration parameters corresponding to a plurality of signaling traces can be carried by setting the TRACE Activation cell format in the signaling trace command to be the form of array. This method is easy to implement and requires minor modification for the present information format.

Figure 5:
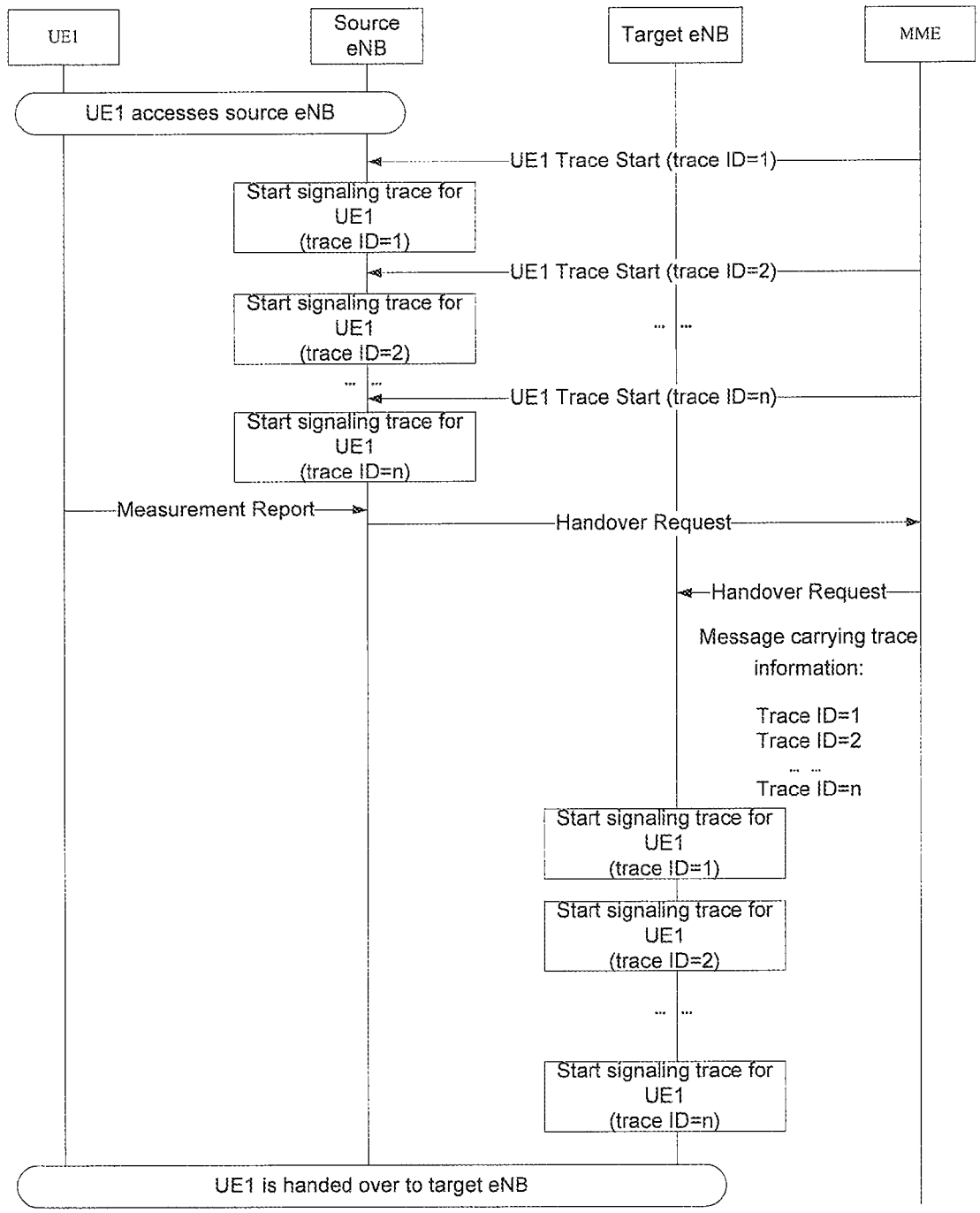
FIG. 5 shows a flowchart of a UE performing S1 handover in the case of a plurality of traces according to the preferred embodiment of the disclosure.

FIG. 5 shows an S1 handover process in the case of a plurality of traces, wherein the process comprises the following steps:

Step 1: UE1 accesses a source eNB.

Step 2: during the service period, the source eNB receives a trace start message transmitted by an MME for n times (n is greater than 1), wherein it is indicated to start the signaling trace for the UE1 in the message; since the trace ID in the trace start message is different, the source eNB starts a total of n traces for the UE1 according to the requirement of the trace configuration parameters transmitted every time.

Step 3: the source eNB receives a measurement report reported by the UE1 and determines that it is S1 interface handover by means of policy.

Step 4: the source eNB assembles the HANDOVER REQUEST message on the S1 interface and transmits it to the MME.

Step 5: after receiving the message, the MME determines that the UE1 has started n traces at the source eNB side, with trace ID of 1 to n, then a Trace Activation cell is filled in the HANDOVER REQUEST message transmitted by the MME to the target eNB, wherein the cell can carry n pieces of trace configuration information with trace ID of 1 to n after being modified into the form of array.

Step 6: after receiving the HANDOVER REQUEST message, the target eNB determines that a Trace Activation cell is carried in the message, and meanwhile starts the n traces with trace ID of 1 to n according to the parameter configuration in the cell.

Step 7: the UE1 is handed over to the target eNB.

(3) the UE corresponding to a plurality of signaling traces has not established an S1 link; the signaling trace command includes a signaling trace start (TRACE START) message or a context setup request (INITIAL CONTEXT SETUP REQUEST) message; the step of transmitting the signaling trace command comprises a step of: in the case of the UE successfully establishing an S1 link, transmitting, by the MME, the signaling trace command to the eNB corresponding to the UE to activate the signaling traces of the UE.

For the UE with attached S1 link not established, when the EM configures a plurality of traces for the MME, the MME can start all traces by transmitting a message (TRACE START or INITIAL CONTEXT SETUP REQUEST) to the eNB when the UE S1 link is established, thereby reducing the signaling interaction load of the S1 interface and improving the performance of the system.

Preferably, the signaling trace configuration parameters corresponding to a plurality of signaling traces can be carried by setting the TRACE Activation cell format in the signaling trace command to be the form of array. This method is easy to implement and requires minor modification for the present information format.

Figure 6:
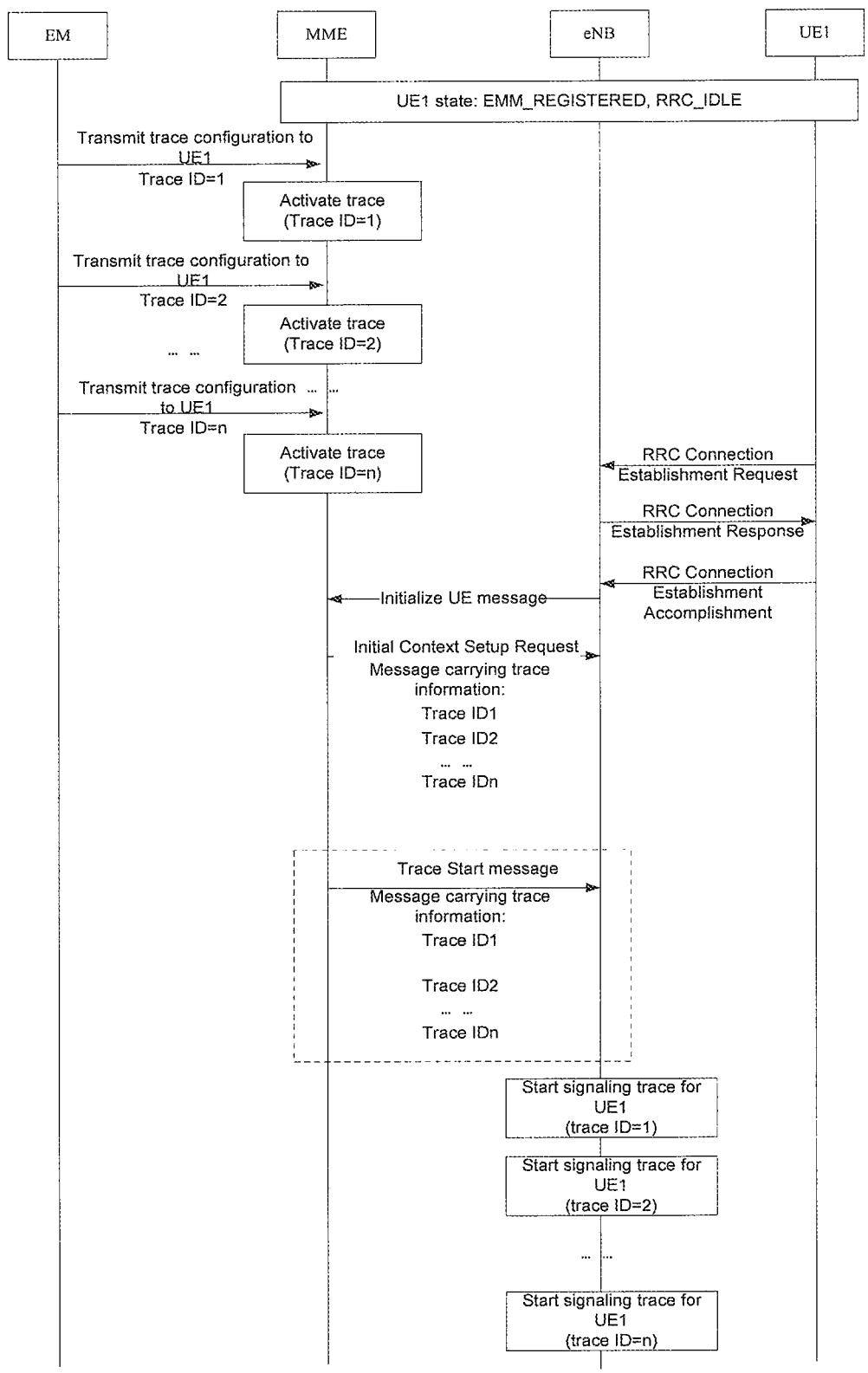
FIG. 6 shows a flowchart of a UE establishing an S1 link in the case of a plurality of traces according to the preferred embodiment of the disclosure.

FIG. 6 shows a UE access process in the case of a plurality of traces, wherein the process comprises the following steps:

Step 1: at this time, UE1 is in EMM_REGISTERED (core network registration), RRC_IDLE state, that is, the core network saves the context information of the UE1 but does not have the S1 logic link from eNB to MME of the UE1. In this case, the EM transmits configuration to the MME to require the start of signaling trace for the UE1, wherein the number of the traces to be started is n (n is greater than 1); the configuration needs to be transmitted to the eNB by the MME and started at the eNB side, when the S1 logic link of the UE1 is established.

Step 2: the UE1 initiates an access process.

Step 3: the INITIAL CONTEXT SETUP REQUEST message returned by the MME to the eNB carries a Trace Activation cell; after the cell is modified into the form of array, the cell can carry n pieces of trace configuration information with trace ID of 1 to n.

Step 4: after receiving the INITIAL CONTEXT SETUP REQUEST message, the eNB side determines that a Trace Activation cell is carried in the message, and meanwhile starts the n traces with trace ID of 1 to n according to the parameter configuration in the cell.

In Step 3, as shown in the dashed block in FIG. 6, the purpose also can be achieved by transmitting a TRACE START message to the eNB through the MME, wherein the messages carries n pieces of trace configuration information with trace ID of 1 to n.

(4) a plurality of signaling traces is activated in certain cell; the signaling trace command is a cell trace (CELL TRAFFIC TRACE) message; the step of transmitting the signaling trace command comprises a step of: transmitting, by the eNB corresponding to the cell, the cell trace message to the MME for the MME to activate the signaling traces of the UE in the cell.

When a plurality of traces configured by the EM for the same cell is activated, all the existing UEs and later added UEs on the activated cell need to transmit a CELL TRAFFIC TRACE message to the MME to start all traces; in this way, the signaling interaction of the S1 interface is greatly reduced.

Preferably, the signaling trace configuration parameters corresponding to the plurality of signaling traces can be carried by setting the cell format of E-UTRAN Trace ID and Trace Collection Entity IP Address in the signaling trace command to be the form of array. This method is easy to implement and requires minor modification for the present information format.

Figure 7:
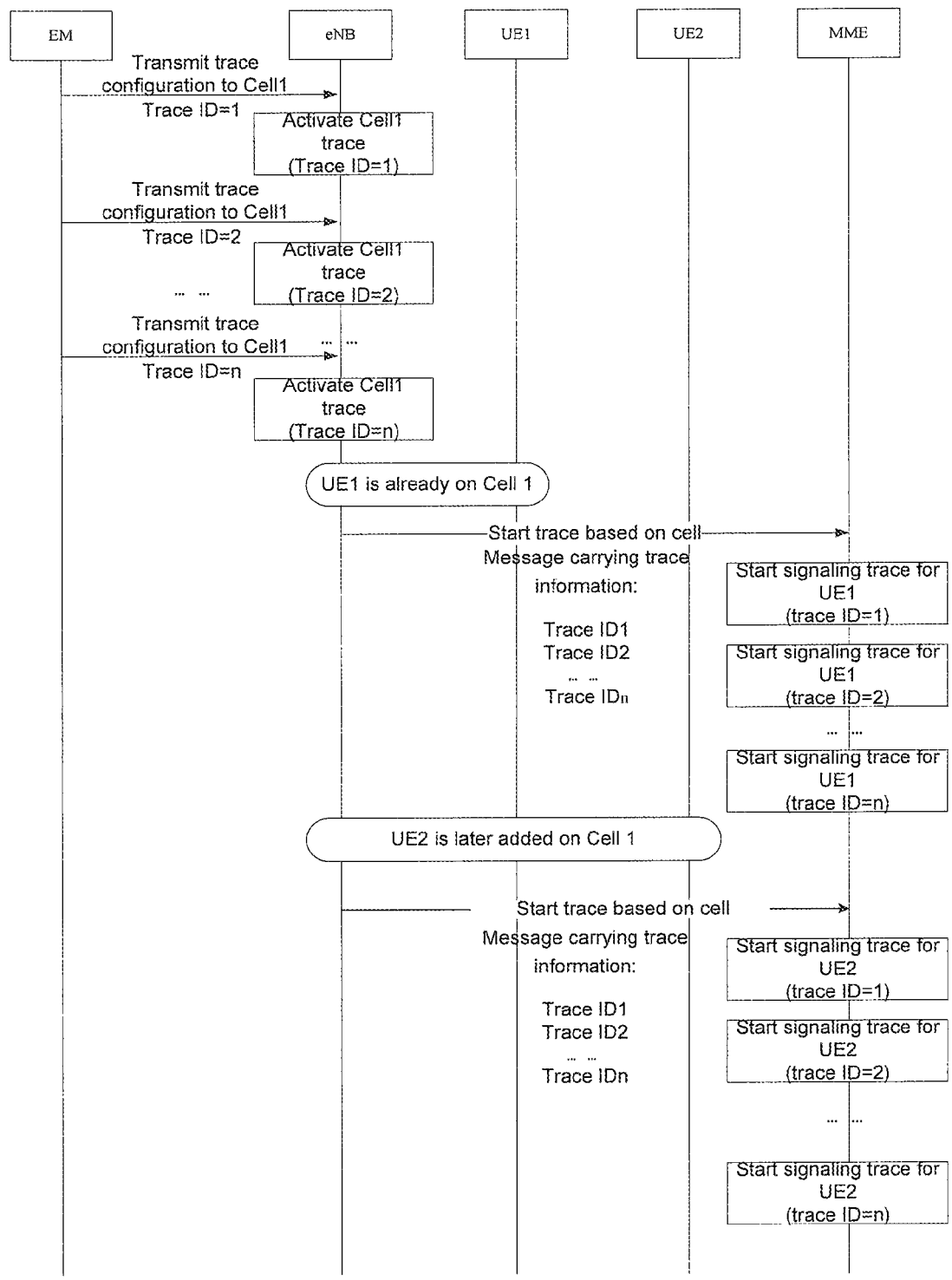
FIG. 7 shows a process flowchart of a cell starting a plurality of traces according to the preferred embodiment of the disclosure.

FIG. 7 shows a process of a cell starting a plurality of traces, wherein the process comprises the following steps:

Step 1: an EM transmits trace configuration to an eNB to require the start of cell signaling trace for Cell1 in the eNB, wherein the number of the traces to be started is n (n is greater than 1).

Step 2: the UE1 is the an existing user in Cell1; the eNB immediately transmits a CELL TRAFFIC TRACE message to an MME to require the start of signaling trace of the UE1, wherein the cell format of the E-UTRAN Trace ID and the Trace Collection Entity IP address in the CELL TRAFFIC TRACE message can carry n pieces of trace configuration information with trace ID of 1 to n after being modified into the form of array.

Step 3: after receiving the CELL TRAFFIC TRACE message, the MME starts the n traces with trace ID of 1 to n according to the configuration requirement in the message.

Step 4: UE2 is a later added user on Cell1; the eNB transmits a CELL TRAFFIC TRACE message to the MME, wherein the message content and the following MME process are the same as the above; no further description is needed here.

Figure 1:
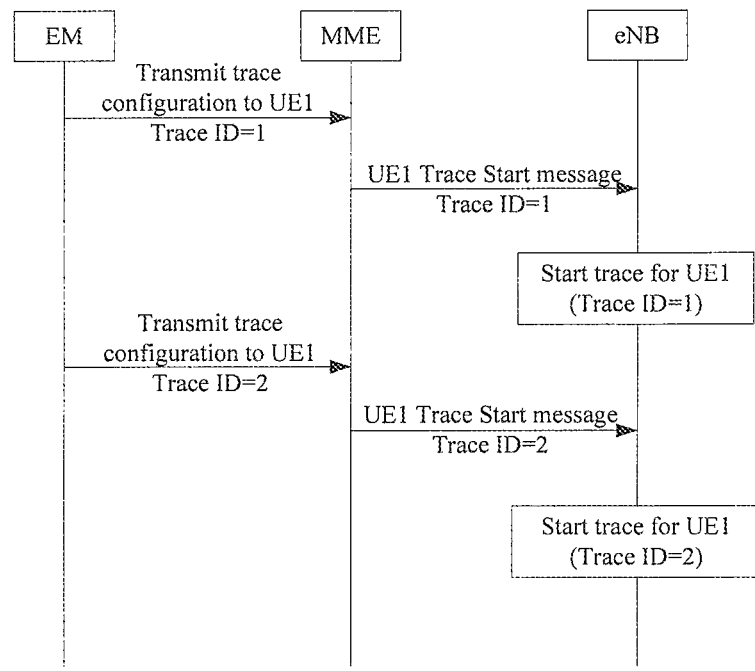
FIG. 1 shows a flowchart of a UE starting a plurality of signaling traces according to related art.
Figure 2:
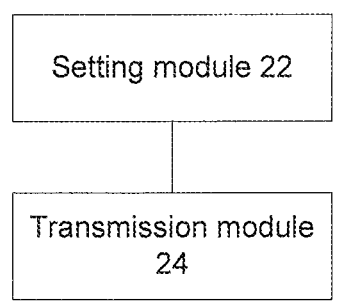
FIG. 2 shows a structure diagram of an apparatus for transmitting signaling trace command according to one embodiment of the invention.

In the case that it is needed to activate the signaling trace, generally, an eNB transmits signaling trace command to an MME or an MME transmits signaling trace command to an eNB; in the case that it is needed to maintain the signaling trace of a switched terminal, generally, a source eNB transmits signaling trace command to a target eNB or an MME transmits signaling trace command to a target eNB; in related art, the transmitting apparatus provided by the embodiment can comprise the eNB and/or the MME above. FIG. 2 shows a structure diagram of an apparatus for transmitting signaling trace command according to one embodiment of the invention, wherein the apparatus comprises:

a setting module 22 configured to carry signaling trace configuration parameters corresponding to a plurality of signaling traces in signaling trace command;

a transmission module 24 coupled to the setting module 22 and configured to transmit the signaling trace command to activate or maintain the signaling traces.

In related art, the signaling trace command transmitted by the apparatus only carries the signaling trace configuration parameters corresponding to a trace; if a plurality of signaling traces exists, the apparatus needs to transmit multiple pieces of signaling trace command; thus the signaling interaction load of the S1 interface is increased. By carrying signaling trace configuration parameters corresponding to a plurality of signaling traces in a signaling trace command through the setting module 22, the apparatus provided by the embodiment can notify the parameters of the current plurality of signaling traces to a receiving end through one piece of information, thereby reducing the signaling interaction load of the S1 interface and improving the performance of the system.

Preferably, the setting module 22 carries the signaling trace configuration parameters corresponding to a plurality of signaling traces by setting the cell format of the signaling trace command to be the form of array. The process of carrying the signaling trace configuration parameters corresponding to a plurality of signaling traces by way of array is easy to implement and requires minor modification of the information format.

To sum up, the solution provided by the embodiment reduces the signaling interaction load of the S1 interface and improves the performance of the system by carrying multiple pieces of trace information through a message.

It should be noted that the steps shown in the flowcharts of the accompanying drawings can be executed in a computer system in which a group of computers can execute instructions. Although the logical order is shown in the flowchart, the illustrated or described steps may be carried out in a different order in some cases.

Obviously, those skilled in the art should understand that the modules and steps described above can be implemented by a common computer device; the modules or steps can be integrated on a single computing device or distributed on a network composed of a plurality of computing devices; optionally, the modules or steps can be implemented by a programming code executable by a computing device, thus they can be stored in a storage device to execute by a computing device, or manufactured into individual integrated circuit module respectively, or several of them can be manufactured into a single integrated circuit module to realize; in this way, the disclosure is not limited to any combination of specific hardware and software.

The above is only the preferred embodiment of the disclosure and not intended to limit the disclosure. For those skilled in the art, various modifications and changes can be made to the disclosure. Any modification, equivalent substitute and improvement within the spirit and principle of the disclosure are deemed to be included within the scope of the disclosure.

What is claimed is:

1. A method for transmitting signaling trace command, comprising the steps of:
   carrying a plurality of signaling trace configuration parameters, which respectively correspond to a plurality of signaling traces, in the signaling trace command, wherein the plurality of signaling traces correspond to a User Equipment (UE); and
   transmitting the signaling trace command to activate or maintain the plurality of signaling traces; wherein the signaling trace configuration parameters corresponding to the plurality of signaling traces are carried by setting a cell format in the signaling trace command to be a form of array;
   wherein X2 interface handover occurs on a User Equipment (UE) corresponding to the plurality of signaling traces; wherein the signaling trace command is a handover request message on the X2 interface; and wherein the step of transmitting the signaling trace command further comprising: transmitting, by a switched source evolved NodeB (eNB), the handover request message to a switched target eNB to maintain the plurality of signaling traces of the UE; or
   S1 interface handover occurs on a UE corresponding to a plurality of signaling traces; wherein the signaling trace command is a handover request message on the S1 interface; wherein transmitting the signaling trace command further comprising:
   transmitting, by a Mobility Management Entity (MME), the handover request message to a switched target eNB to maintain the plurality of signaling traces of the UE; or
   a UE corresponding to a plurality of signaling traces has not established an S1 link; wherein the signaling trace command includes a signaling trace start message or a context setup request message; wherein transmitting the signaling trace command further comprising: when the UE successfully establishes an S1 link, transmitting, by a MME, the signaling trace command to an eNB corresponding to the UE to activate the plurality of signaling traces of the UE; or
   the plurality of signaling traces is activated in a cell; wherein the signaling trace command is a cell trace message; wherein transmitting the signaling trace command further comprising: transmitting, by an eNB corresponding to the cell, the cell trace message to an MME for the MME to activate the plurality of signaling traces of UEs in the cell.

2. The method according to claim 1, wherein the signaling trace configuration parameters corresponding to a plurality of signaling traces are carried by setting a trace activation cell format in the signaling trace command to be a form of array.

3. The method according to claim 1, wherein the signaling trace configuration parameters corresponding to the plurality of signaling traces are carried by setting a cell format of Evolved Universal Mobile Telecommunication System Terrestrial Radio Access Network Trace Identifies (E-UTRAN Trace ID) and Trace Collection Entity Internet Protocol (IP) Address in the signaling trace command to be a form of array.

4. The method according to claim 1, wherein the signaling trace configuration parameters corresponding to a plurality of signaling traces are carried by setting a trace activation cell format in the signaling trace command to be a form of array.

5. The method according to claim 1, wherein the signaling trace configuration parameters corresponding to a plurality of signaling traces are carried by setting a trace activation cell format in the signaling trace command to be a form of array.

6. An apparatus for transmitting signaling trace command, comprising:
   a setting module configured to carry a plurality of signaling trace configuration parameters, which respectively correspond to a plurality of signaling traces in the signaling trace command, wherein the plurality of signaling traces correspond to a User Equipment (UE); and
   a transmission module configured to transmit the signaling trace command to activate or maintain the plurality of signaling traces; wherein the setting module carries the signaling trace configuration parameters corresponding to the plurality of signaling traces by setting a cell format of the signaling trace command to be a form of array;
   wherein X2 interface handover occurs on a User Equipment (UE) corresponding to the plurality of signaling traces; wherein the signaling trace command is a handover request message on the X2 interface; and wherein the step of transmitting the signaling trace command further comprising: transmitting, by a switched source evolved NodeB (eNB), the handover request message to a switched target eNB to maintain the plurality of signaling traces of the UE; or
   S1 interface handover occurs on a UE corresponding to a plurality of signaling traces; wherein the signaling trace command is a handover request message on the S1 interface; wherein transmitting the signaling trace command further comprising: transmitting, by a Mobility Management Entity (MME), the handover request message to a switched target eNB to maintain the plurality of signaling traces of the UE; or
   a UE corresponding to a plurality of signaling traces has not established an S1 link; wherein the signaling trace command includes a signaling trace start message or a context setup request message; wherein transmitting the signaling trace command further comprising: when the UE successfully establishes an S1 link, transmitting, by a MME, the signaling trace command to an eNB corresponding to the UE to activate the plurality of signaling traces of the UE; or
   the plurality of signaling traces is activated in a cell; wherein the signaling trace command is a cell trace message; wherein transmitting the signaling trace command further comprising: transmitting, by an eNB corresponding to the cell, the cell trace message to an MME for the MME to activate the plurality of signaling traces of UEs in the cell.

* * * * *